United States Patent
Kusumura et al.

(10) Patent No.: US 9,519,633 B2
(45) Date of Patent: Dec. 13, 2016

(54) WORD LATENT TOPIC ESTIMATION DEVICE AND WORD LATENT TOPIC ESTIMATION METHOD

(71) Applicant: NEC Corporation, Minato-ku, Tokyo (JP)

(72) Inventors: Yukitaka Kusumura, Tokyo (JP); Yusuke Muraoka, Tokyo (JP); Hironori Mizuguchi, Tokyo (JP); Dai Kusui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/417,855

(22) PCT Filed: Jul. 9, 2013

(86) PCT No.: PCT/JP2013/004242
§ 371 (c)(1),
(2) Date: Jan. 28, 2015

(87) PCT Pub. No.: WO2014/020834
PCT Pub. Date: Feb. 6, 2014

(65) Prior Publication Data
US 2015/0193425 A1    Jul. 9, 2015

(30) Foreign Application Priority Data

Jul. 31, 2013 (JP) .................. 2012-169986

(51) Int. Cl.
*G06F 17/27* (2006.01)
*G06F 17/28* (2006.01)

(52) U.S. Cl.
CPC ........... *G06F 17/27* (2013.01); *G06F 17/2745* (2013.01); *G06F 17/28* (2013.01)

(58) Field of Classification Search
CPC .... G06F 17/2785; G06F 17/279; G06F 17/27; G06F 17/28; G06F 17/2745
See application file for complete search history.

(56) References Cited

U.S. PATENT DOCUMENTS 8,630,975 B1 * 1/2014 Guo et al. .............. G06N 7/005
707/608
2010/0153318 A1 * 6/2010 Branavan .......... G06F 17/30705
706/12

(Continued)

FOREIGN PATENT DOCUMENTS

EP        1347395 A2 *  9/2003  ............. G06F 17/27
JP   2008152634 A  *  7/2008

OTHER PUBLICATIONS

Perotte, Adler J., et al. "Hierarchically supervised latent Dirichlet allocation." Advances in Neural Information Processing Systems. 2011.*

(Continued)

*Primary Examiner* — Brian Albertalli

(57) ABSTRACT

Provided are a word latent topic estimation device and a word latent topic estimation method which are capable of hierarchically performing processing and which are capable of rapidly estimating latent topics of a word while taking into consideration a mixed state of topics. The present invention is provided with: a document data addition unit (11) which inputs a document which includes one or more words; a level setting unit (12) which sets a number of topics at each level in accordance with a hierarchical structure of topics for hierarchically estimating latent topics of a word; a higher-level constraint creation unit (15) which, on the basis of results of topic estimation at a given level with regard to a word within the document, creates a higher-level constraint indicating an identifier of a topic for which there is a possibility of being assigned to the word and a prob- (Continued)

ability of being assigned to the topic; and a higher-level-constraint-attached topic estimation unit (13) which, when estimating the probability of each word being assigned to each topic, refers to the higher-order constraint, uses the probability of being assigned to a parent topic at the higher level as a weight, and performs estimation processing to a lower-level topic.

9 Claims, 11 Drawing Sheets

(56) References Cited

U.S. PATENT DOCUMENTS

| | | | | |
|---|---|---|---|---|
| 2012/0078918 | A1* | 3/2012 | Somasundaran | G06F 17/278 707/748 |
| 2012/0096029 | A1* | 4/2012 | Tamura | G06F 17/2765 707/772 |
| 2012/0179634 | A1* | 7/2012 | Chen | G06N 99/005 706/12 |
| 2012/0203752 | A1* | 8/2012 | Ha-Thuc | G06F 17/30705 707/706 |
| 2012/0239668 | A1* | 9/2012 | Bhattacharyya | G06Q 10/10 707/754 |
| 2012/0296637 | A1* | 11/2012 | Smiley | G06K 9/6201 704/9 |
| 2013/0159236 | A1* | 6/2013 | Vladislav | G06F 17/2785 706/46 |
| 2013/0183022 | A1* | 7/2013 | Suzuki | G06K 9/00718 386/241 |
| 2013/0262083 | A1* | 10/2013 | Hershey | G06F 17/2785 704/9 |
| 2014/0229160 | A1* | 8/2014 | Galle | G06F 17/27 704/9 |

OTHER PUBLICATIONS

Blei, David M., Andrew Y. Ng, and Michael I. Jordan. "Latent dirichlet allocation." The Journal of machine Learning research 3 (2003): 993-1022.*

Issei Sato and Hiroshi Nakagawa, "Deterministic Online Bayesian Learning in Latent Dirichlet Allocation", Information Processing Society of Japan Technical Report—Natural Language Processing, vol. 2009-NL-193, No. 7. English abstract.

Ying Zhao and George Karypis, "Hierarchical Clustering Algorithms for Document Datasets", Data Mining and Knowledge Discovery, vol. 10, No. 2, pp. 141-168, 2005.

Koki Hayashi, Koji Eguchi, Atsuhiro Takasu, "Probabilistic Topic Models with Category Hierarchy and its Applications", Information Processing Society of Japan Technical Report, 2011,5, Information Processing Society of Japan, Technical Report, Natural Language Processing (NL) No. 200 [CD-ROM], Feb. 15, 2011, [ISSN] 1884-0930, pp. 1-8. English abstract on p. 3.

Haruka Shigematsu, Ichiro Kobayashi, "Text Summarization based on Latent Topic Distribution", The 26th Annual Conference of the Japanese Society for Artificial Intelligence Proceedings 2012, [CD-ROM] The 26th Annual Conference of the Japanese Society for Artificial Intelligence 2012, Proceedings, Jun. 12, 2012 [ISSN] 1347-9881, pp. 1-4. English abstract on p. 5.

International Search Report for PCT Application No. PCT/JP2013/004242, mailed on Aug. 6, 2013.

English Translation of the Written Opinion of the International Search Authority for PCT Application No. PCT/ JP2013/004242, mailed on Aug. 6, 2013.

* cited by examiner

WORD LATENT TOPIC ESTIMATION DEVICE AND WORD LATENT TOPIC ESTIMATION METHOD

TECHNICAL FIELD

The present invention relates to a word latent topic estimation device and a word latent topic estimation method that estimate latent topics for words in document data.

BACKGROUND ART

In the field of natural language processing, there is a demand for dealing with meanings behind words, not dealing with text data as merely symbol sequences. Recently, much attention has been given to devices that estimate latent topics (hereinafter referred to as the latent topic estimation device).

A topic is data representing a notion, meaning or field that lies behind each word. A latent topic is not a topic manually defined beforehand but instead is a topic that is automatically extracted on the basis of the assumption that "words that have similar topics are likely to co-occur in the same document" by taking an input of document data alone. In the following description, a latent topic is sometimes simply referred to as a topic.

Latent topic estimation is processing that takes an input of document data, posits that k latent topics lie behind words contained in the document, and estimates a value representing whether or not each of the words relates to each of the 0-th to (k−1)-th latent topics.

Known latent topic estimation methods include latent semantic analysis (LSA), probabilistic latent semantic analysis, and latent Dirichlet allocation (LDA).

Particularly LDA will be described here. LDA is a latent topic estimation method that assumes that each document is a mixture of k latent topics. LDA is predicated on a document generative model based on this assumption and can estimate a probability distribution in which words represent relations between latent topics in accordance with the generative model.

A word generative model in LDA will be described first.

Generation of documents in LDA is determined by the follow two parameters.

$$\alpha\_\{t\}$$

$$\beta\_\{t,v\}$$

$\alpha\_\{t\}$ is a parameter of a Dirichlet distribution that generates a topic t. $\beta\_\{t, v\}$ represent the probability of a word v being chosen from a topic t (the word topic probability). Note that $\_\{t, v\}$ represents that subscripts t, v are written below β.

A generative model in LDA is a model for generating words by using the following procedure in accordance with these parameters. The generative model first determines a mixture ratio $\theta\_\{j, t\}$ (0≤t<k) of latent topics in accordance with the Dirichlet distribution of parameter α for a document. Then, generation of a word is repeated a number of times equivalent to the length of the document in accordance with the mixture ratio. Generation of each word is accomplished by choosing one topic t in accordance with the topic mixture ratio $\theta\_\{j, t\}$ and then choosing words v in accordance with the probabilities $\beta\_\{t, v\}$.

LDA allows α and β to be estimated by assuming such a generative model as described above and giving document data. The estimation is based on the maximum likelihood principle and is accomplished by computing $\alpha\_\{t\}$ and $\beta\_\{t, v\}$ that are likely to replicate a set of document data.

LDA differs from the other latent topic estimation methods in that LDA deals with latent topics of a document using the mixture ratio $\theta\_\{j, t\}$ and therefore a document can have multiple topics. A document written in a natural language often contains multiple topics. LDA can estimate word topic probabilities more accurately than the other latent topic estimation methods can do.

NPL 1 describes a method for estimating α, β one at a time (every time a document is added). A latent topic estimation device to which the method described in NPL 1 is applied repeats computations of the parameters given below when a document j is given, thereby estimating word topic probability β. FIG. 9 is a diagram illustrating an exemplary configuration of the latent topic estimation device to which the method described in NPL 1 is applied.

The latent topic estimation device illustrated in FIG. 9 repeats computations of the following parameters in order to estimate β.

$\gamma\_\{j, t\}^\{k\}$
$\phi\_\{j, i, t\}^\{k\}$
$n\_\{j, t\}^\{k\}$
$n\_[j, t, v]^\{k\}$ $\gamma\_\{j, t\}^\{k\}$ is a parameter (document topic parameter) on a Dirichlet distribution representing the probability of a topic t appearing in document j. Note that ^{k} represents that the superscript k is written above γ. $\phi\_\{j, i, t\}^\{k\}$ is the probability (document word topic probability) that the i-th word in document j being assigned to topic t. $n\_\{j, t\}^\{k\}$ is an expected value of the number of times assignments to topic t in document j (the number of document topics). n{j, t, v}^{k} is an expected value indicating the number of times a word v is assigned to topic t in document j (the number of word topics).

FIG. 9 illustrates a configuration of the latent topic estimation device and focuses only on estimation of word topic probabilities β.

The latent topic estimation device illustrated in FIG. 9 includes a document data addition unit 501 adding document data that includes one or more words and is input by a user operation or an external program, a topic estimation unit 502 estimating latent topics by repeatedly computing document word topic probability in accordance with a generative model premised on a mixture distribution of topics for an added document, a topic distribution storage unit 504 storing the number of word topics computed by the topic estimation unit 502, a data update unit 503 updating data in the topic distribution storage unit 504 on the basis of the number of word topics computed by the topic estimation unit 502, and a word topic distribution output unit 505 which, when called by a user operation or an external program, computes word topic probability on the basis of the number of word topics in the topic distribution storage unit 504 and outputs the result.

A flow of processing in the latent topic estimation device illustrated in FIG. 9 will be described below. FIG. 10 is a flowchart illustrating topic estimation processing performed in the latent topic estimation device illustrated in FIG. 9.

First, when a document including one or more words is added to the document data addition unit 501, the latent topic estimation device illustrated in FIG. 9 starts the processing. The added document is input into the topic estimation unit 502. The topic estimation unit 502 checks words in the document data in sequence and repeatedly updates the document word topic probability, the number of document topics, the number of word topics, and the document topic parameter to perform probability estimation.

The processing by the topic estimation unit 502 illustrated in FIG. 10 will be described by using Equations 1 to 4, 2' and 4'.

[Math. 1]

$$\Phi_{j,i,t}^k = \frac{\beta_{t,w_{j,i}}^k \exp\left\{\psi\left(\gamma_{j,t}^k - \psi\left(\sum_{t=i}^{T}\gamma_{j,t}^k\right)\right)\right\}}{\sum_t \beta_{t,w_{j,i}}^k \exp\left\{\psi\left(\gamma_{j,t}^k - \psi\left(\sum_{t=i}^{T}\gamma_{j,t}^k\right)\right)\right\}}$$ (Eq. 1)

[Math. 2]

$$n_{j,t}^k = n_{j,t}^{old} - \phi_{j,i,t}^{old} + \phi_{j,i,t}^k$$ (Eq. 2)
$$n_{j,t,v}^k = n_{j,t,v}^{old} + (\phi_{j,i,t}^k - \phi_{j,i,t}^{old})I(w_{j,i} = v)$$

[Math. 3]

$$n_{j,t}^{old} = \sum_i \phi_{j,i,t}^{old}$$ (Eq. 2')
$$n_{j,t,v}^{old} = \sum_i \phi_{j,i,t}^{old} I(w_{j,i} = v)$$

[Math. 4]

$$\gamma_{t,v}^k = \alpha_t^k + n_{j,t}^k$$ (Eq. 3)

[Math. 5]

$$\beta_{t,v}^k = \frac{\lambda_0 + A_{k,t,v} + n_{j,t,v}^k}{\sum_t (\lambda_0 + A_{k,t,v} + n_{j,t,v}^k)}$$ (Eq. 4)

[Math. 6]

$$\beta_{t,v}^k = \frac{\lambda_0 + n_{j,t,v}^{old}}{\sum_t (\lambda_0 + n_{j,t,v}^{old})}$$ (Eq. 4')

When a document j made up of N_{j} words is added, the topic estimation unit 502 computes initial values of the following parameters (step n1).
φ_{j, i, t}^{old} (0≤t<k, 0≤i<N_{j})
n_{j, t}^{old} (0≤t<k)
n_{j, t, v}^{old} (0≤t<k)
γ_{j, t}^{k} (0≤t<k)
β_{t, v}^{k} (0≤t<k)

n_{j, t}^{old} is the initial value of the number of document topics and is computed according to Equation 2'. n_{j, t, v}^{old} is the initial value of the number of word topics and is computed according to Equation 2'. γ_{j, t}^{k} is the initial value of the document topic parameter and is computed according to Equation 3. β_{t, v}^{k} is the initial value of the word topic probability and is computed according to Equation 4'.

Note that φ_{j, i, t}^{old} is the initial value of the document word topic probability and is randomly assigned.

The function I (condition) in Equations 2 and 2' returns 1 when a condition is satisfied, and otherwise returns 0. w_{j, i} represents the i-th word in document j.

Then, the topic estimation unit 502 performs processing for updating the values of φ_{j, i, t}^{k}, β_{t, v}^{k} and γ_{j, t}^{k} for each topic t (0≤t<k) for each word (step n2). The update processing is accomplished by computing Equations 1, 2, 3 and 4 in order.

In Equation 1, ψ(x) represents a digamma function and exp(x) represents an exponential function. A_{t, v} in Equation 4 is stored in the topic distribution storage unit 504. Note that when there is not a corresponding value in the topic distribution storage unit 504 at time such as the time the first document is added, 0 is assigned to A_{t, v}.

When the parameter updating for all of the words is completed, the topic estimation unit 502 replaces φ_{j, i, t}^{old}, n_{j, t}^{old}, and n_{j, t, v}^{old} with the values φ_{j, i, t}^{k}, n_{j, t}^{k}, and n_{j, t, v}^{k} computed at the current topic estimation in preparation for next update processing. Then the topic estimation unit 502 performs update processing in accordance with Equations 1 to 4 again for each word.

The topic estimation unit 502 then determines whether to end the processing (step n3). The number of iterations of step n2 performed after a document is added is stored and, upon completion of a certain number of iterations (Yes, at step n3), the topic estimation unit 502 ends the processing.

The data update unit 503 updates the value in the topic distribution storage unit 504 on the basis of the number of word topics n_{j, t, v} among the values computed by the topic estimation unit 502. The update is performed according to Equation 5.

[Math. 7]

$$A_{k,t,v} = A_{k,t,v} + n_{j,t,v}^k$$ (Eq. 5)

The word topic distribution output unit 505 is called by a user operation or an external program. The word topic distribution output unit 505 outputs β_{t, v} according to Equation 6 on the basis of the value in the topic distribution storage unit 504.

[Math. 8]

$$\beta_{t,v}^k = \frac{\lambda_0 + A_{k,t,v}}{\sum_t (\lambda_0 + A_{k,t,v})}$$ (Eq. 6)

This method does not store all documents and does not repeat the estimation processing for all documents but repeats estimation only for an added document when the document is added. This method is known to be capable of efficient probability estimation and to operate faster than common LDA. However, the speed is not high enough, processing time proportional to the number of topics is required and therefore when the number of topics k is large, much time is required. This problem may be addressed by using hierarchical clustering.

NPL 2 describes a hierarchical clustering method. In order to estimate the latent topic in the document data, this method recursively performs processing in which clustering (=topic estimation) with two clusters (=the number of topics) is performed to divide data into two. This enables topics to be assigned to each document on the order of log(K). Although the method is a technique in a similar field, the method is merely a technique to assign topics to documents and cannot estimate the probability of a topic being assigned to a word. Furthermore, a single topic is assigned to each piece of data and a mixture of multiple topics cannot be represented.

CITATION LIST

Non Patent Literature

[NPL 1] Issei Sato and Hiroshi Nakagawa, "Deterministic Online Bayesian Learning in Latent Dirichlet Allocation", Information Processing Society of Japan Technical Report—Natural Language Processing, Vol. 2009-NL-193, No. 7

[NPL 2] Ying Zhao and George Karypis, "Hierarchical Clustering Algorithms for Document Datasets", Data Mining and Knowledge Discovery, Vol. 10, No. 2, pp. 141-168, 2005

SUMMARY OF INVENTION

Technical Problem

Latent topic estimation methods that are capable of dealing with a mixture of topics require much processing time that is proportional to the number of topics. A method that efficiently performs processing in a case where the number of topics is large is a hierarchical latent topic estimation method. A topic tree and hierarchical topic estimation are defined below.

A topic tree is data of W-ary tree having nodes representing topics, edges representing semantic inclusive relations between topics, and depth D. Each of the topics in the topic tree has an ID (topic ID) that is unique at each level.

FIG. 11 is a diagram illustrating one exemplary topic tree with W=3 and D=2. Each solid line circle in FIG. 11 represents a topic and the number in each circle represents a topic ID. The topic tree has two levels. Specifically, the topic tree has a higher-level made up of topics 0 to 2 which are in the first tier viewed from the root and a lower level made up of topics 0 to 8 below the first tier. Edges between the higher-level and the lower-level represent inclusion relation and mean that the notions of topics 0 to 2, for example, at the lower-level are included in the notion of topic 0 at the higher-level. Similarly, edges means that the notions of topics 3 to 5 at the lower-level are included in the notion of topic 1 at the higher-level.

Hierarchical latent topic estimation means that topic estimation for each word is performed at each of the levels in such a manner that there are no inconsistencies in semantic inclusive relations between topics in a topic tree represented as described above.

However, it is difficult to estimate latent topics of words by the hierarchical latent topic estimation method while taking into consideration a mixture of topics.

An object of the present invention is to provide a word latent topic estimation device and a word latent topic estimation method that are capable of hierarchical processing and fast estimation for latent topics of words while taking into consideration a mixture of topics.

Solution to Problem

A word latent topic estimation device according to the present invention includes a document data addition unit inputting a document including one or more words, a level setting unit setting the number of topics at each level in accordance with a hierarchical structure of topics for hierarchically estimating a latent topic of a word, a higher-level constraint creation unit creating, for a word in the document on the basis of a result of topic estimation at a given level, a higher-level constraint indicating an identifier of a topic that is likely to be assigned to the word and the probability of the word being assigned to the topic, and a higher-level-constraint-attached topic estimation unit which, when estimating the probability of each word in the input document being assigned to each topic, refers to the higher-level constraint and uses the probability of the word being assigned to a parent topic at a higher level as a weight to perform estimation processing for a lower-level topic.

A word latent topic estimation method according to the present invention includes inputting a document including one or more words, setting the number of topics at each level in accordance with a hierarchical structure of topics for hierarchically estimating a latent topic of a word, creating, for a word in the document on the basis of a result of topic estimation at a given level, a higher-level constraint indicating an identifier of a topic that is likely to be assigned to the word and the probability of the word being assigned to the topic, and when estimating the probability of each word in the input document being assigned to each topic, referring to the higher-level constraint and using the probability of the word being assigned to a parent topic at a higher level as a weight to perform estimation processing for a lower-level topic.

Advantageous Effects of Invention

The present invention enables hierarchical processing and allows latent topics of words to be estimated fast while taking into consideration a mixture of the topics.

DESCRIPTION OF EMBODIMENTS

First Exemplary Embodiment

Figure 1:
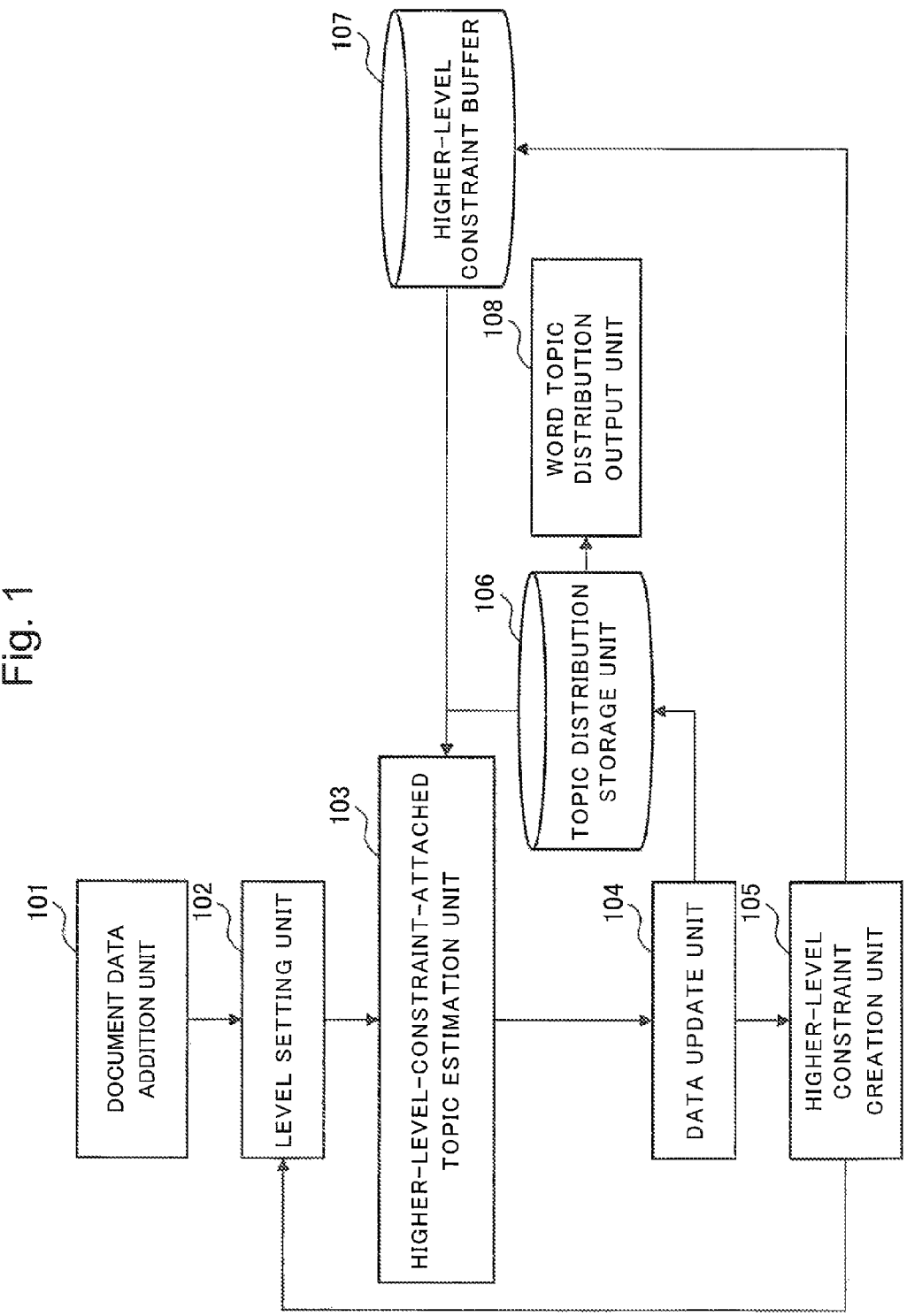
FIG. 1 is a block diagram illustrating an exemplary configuration of a word latent topic estimation device in a first exemplary embodiment according to the present invention.

FIG. 1 is a block diagram illustrating an exemplary configuration of a word latent topic estimation device in a first exemplary embodiment according to the present invention. The word latent topic estimation device according to the present invention includes a document data addition unit 101, a level setting unit 102, an higher-level-constraint-attached topic estimation unit 103, a data update unit 104, a higher-level constraint creation unit 105, a topic distribution storage unit 106, a higher-level constraint buffer 107, and a word topic distribution output unit 108.

The document data addition unit 101 adds document data which includes one or more words and is input by a user operation or an external program.

The level setting unit 102 sets the number of topics k on the basis of width W and depth D, which are preset parameters, and calls processing of the higher-level-constraint-attached topic estimation unit 103.

The higher-level-constraint-attached topic estimation unit 103 takes inputs of the number of topics k set in the level setting unit 102, document data provided from the document data addition unit 101, and a higher-level constraint in the higher-level-constraint buffer 107 and performs topic estimation for k topics.

The data update unit 104 updates data in the topic distribution storage unit 106 on the basis of the number of word topics computed by the higher-level-constraint-attached topic estimation unit 103.

The higher-level constraint creation unit 105 is called after the processing by the data update unit 104 and creates a higher-level constraint on the basis of a document word topic probability computed by the higher-level-constraint-attached topic estimation unit 103. The higher-level constraint creation unit 105 stores the created higher-level constraint in the higher-level-constraint buffer 107 and calls the level setting unit 102.

The topic distribution storage unit 106 stores the number of word topics provided from the data update unit 104. The topic distribution storage unit 106 in this exemplary embodiment holds the number of word topics using a word v, the number of topics k, and topics t as a key. The topic distribution storage unit 106 stores information having a data structure given below.
word: k: topic ID→the number of word topics An example of data stored in the topic distribution storage unit 106 is given below.
children: 4: 0→2.0
children: 4: 1→1.0

The example indicates that, in the topic estimation where the number of topics is 4, the number of word topics for the 0-th topic of the word "children" is 2.0 and the number of word topics for the 1st topic of the word "children" is 1.0.

The higher-level-constraint buffer 107 stores a higher-level constraint created by the higher-level constraint creation unit 105. In this exemplary embodiment, the higher-level-constraint buffer 107 holds a topic ID that is likely to be assigned to the i-th word in a document in the last higher-level topic estimation performed and a document word topic probability $\phi$ for the topic. The higher-level-constraint buffer 107 stores information having the following data structure.
position i in document→topic ID: document word topic probability An example of data stored in the higher-level-constraint buffer 107 is given below.
5→0: 0.3, 8: 0.7

This example indicates that the probability of the fifth word being assigned to the 0th topic is 0.3 and the probability of the fifth word being assigned to the eighth topic is 0.7.

The word topic distribution output unit 108, when called by a user operation or an external program, computes a word topic probability on the basis of the number of word topics in the topic distribution storage unit 106 and outputs the result.

Note that the document data addition unit 101, the level setting unit 102, the higher-level-constraint-attached topic estimation unit 103, the data update unit 104, the higher-level constraint creation unit 105 and the word topic distribution output unit 108 are implemented by a CPU or the like of the word latent topic estimation device.

The topic distribution storage unit 106 and the higher-level constraint buffer 107 are implemented by a storage device such as a memory of the word latent topic estimation device.

An operation of this exemplary embodiment will be described below.

Processing in this exemplary embodiment is generally made up of a flow of adding document data and an output flow.

Figure 2:
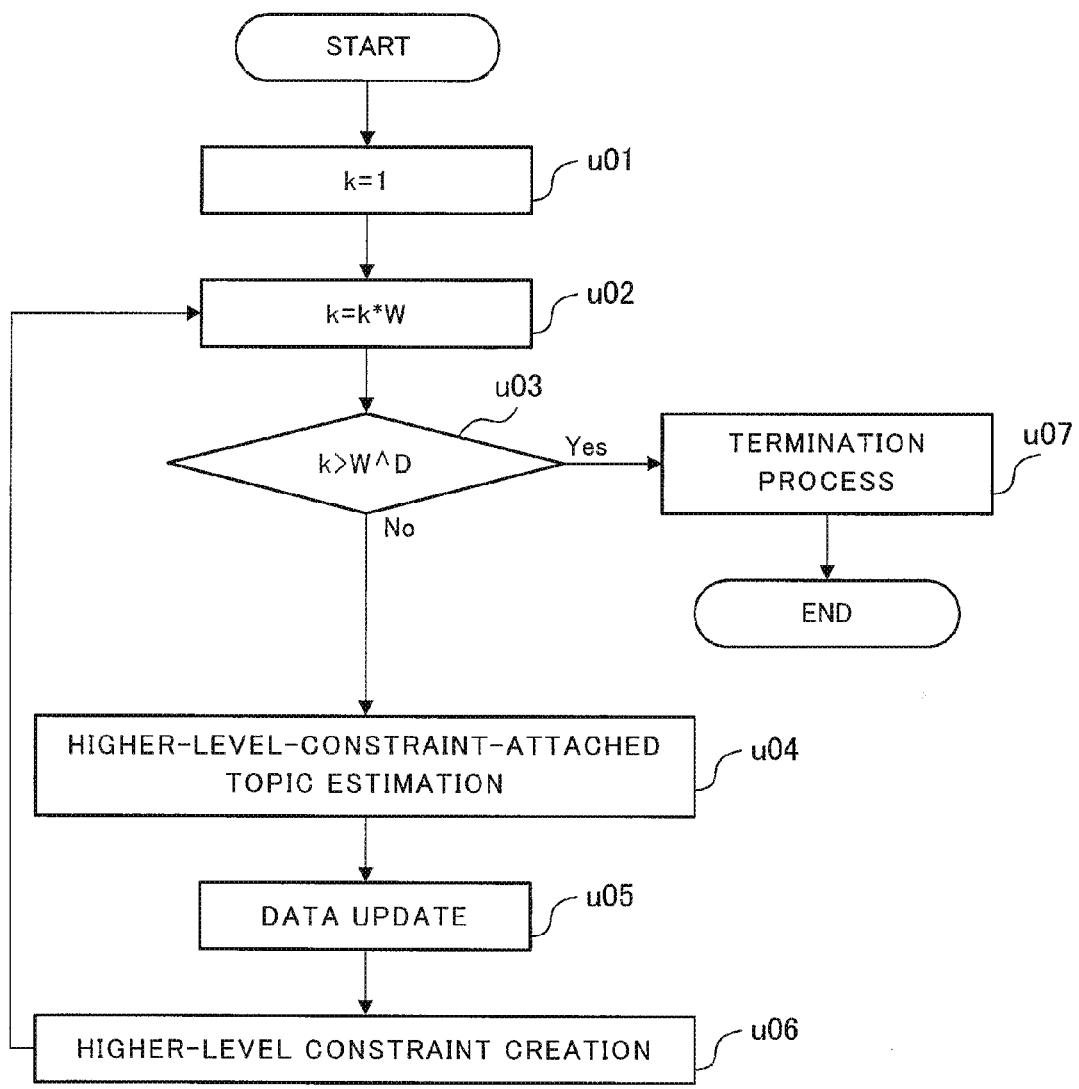
FIG. 2 is a flowchart illustrating a flow of adding document data in the first exemplary embodiment.

FIG. 2 is a flowchart illustrating the flow of adding document data in the first exemplary embodiment. The flow of adding document data will be described first with reference to FIG. 2.

The flow of adding document data is started when a user operation or an external program inputs document data including one or more words.

When document data is added, first the level setting unit 102 sets 1 as the initial value of the number of topics k (step u01). The level setting unit 102 then multiplies the number of topics k by W (step u02). The level setting unit 103 then determines on the basis of the value of k whether to end the processing.

When the value of k is greater than the D-th power of W (Yes at step u03), the word latent topic estimation device performs a termination processing (step u07). In the termination processing, the higher-level-constraint buffer 107 is cleared in preparation for addition of a next document. Otherwise (No at step u03), the word latent topic estimation device proceeds step u04, where topic estimation processing for k topics is performed. At step u04, the higher-level-constraint-attached topic estimation unit 103 performs the latent topic estimation processing for k topics.

Figure 9:
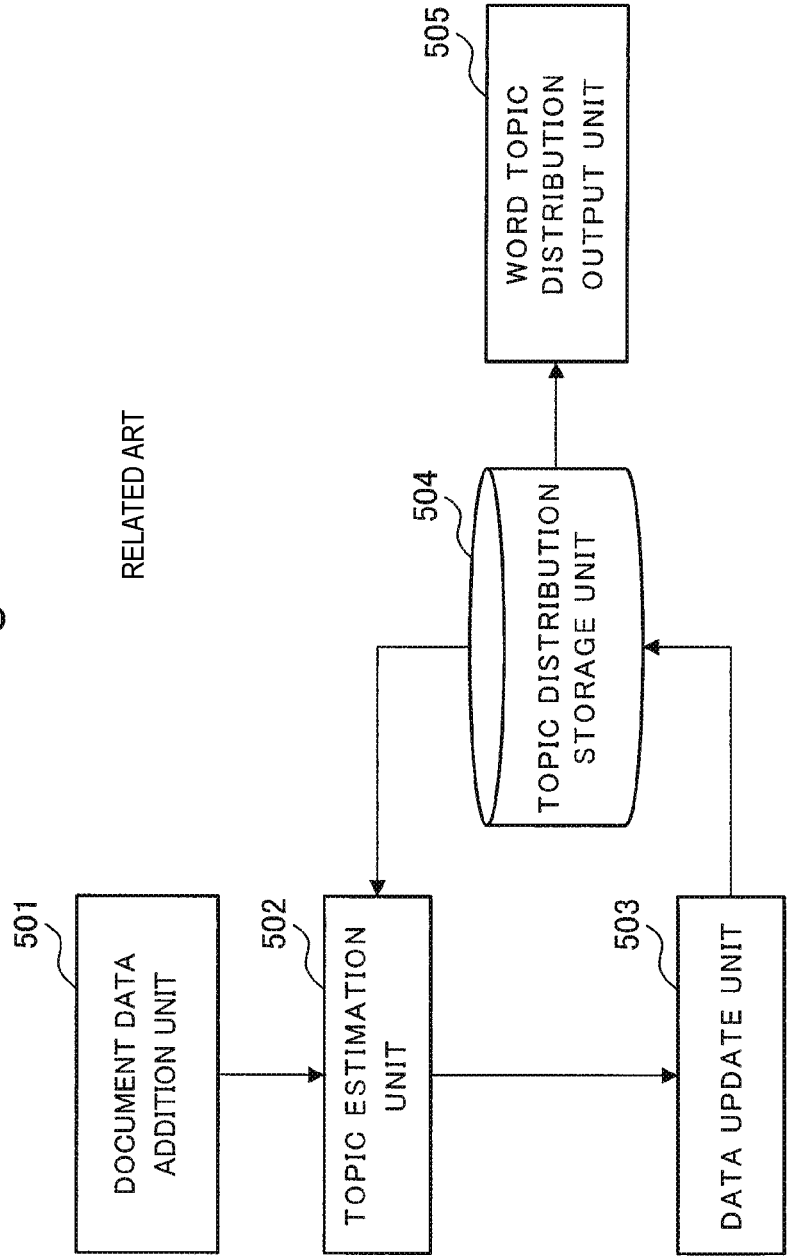
FIG. 9 is a diagram illustrating an exemplary configuration of a latent topic estimation device to which the method described in NPL 1 is applied.
Figure 10:
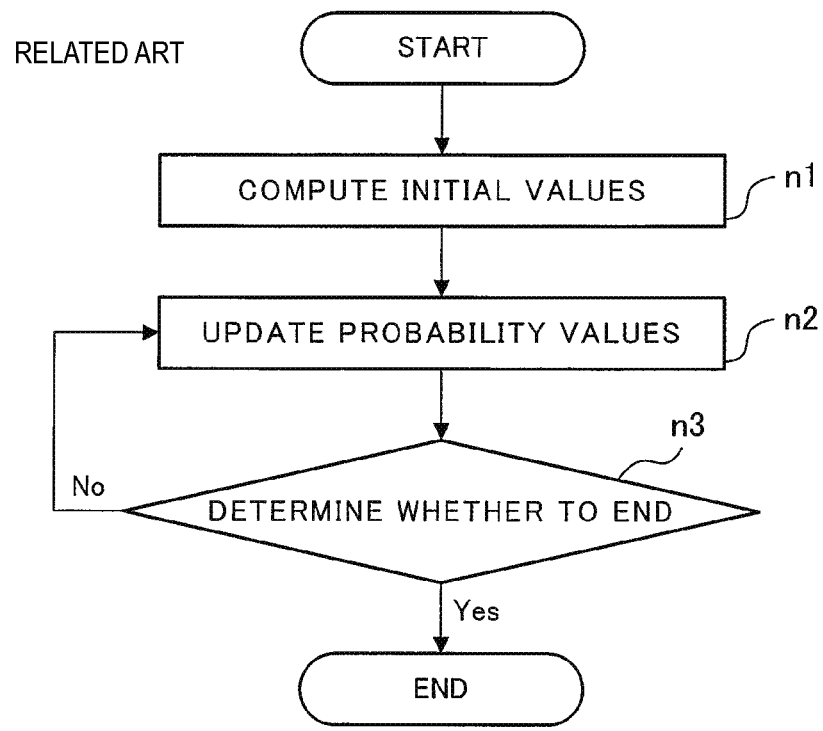
FIG. 10 is a flowchart illustrating topic estimation processing by the latent topic estimation device illustrated in FIG. 9.
Figure 11:
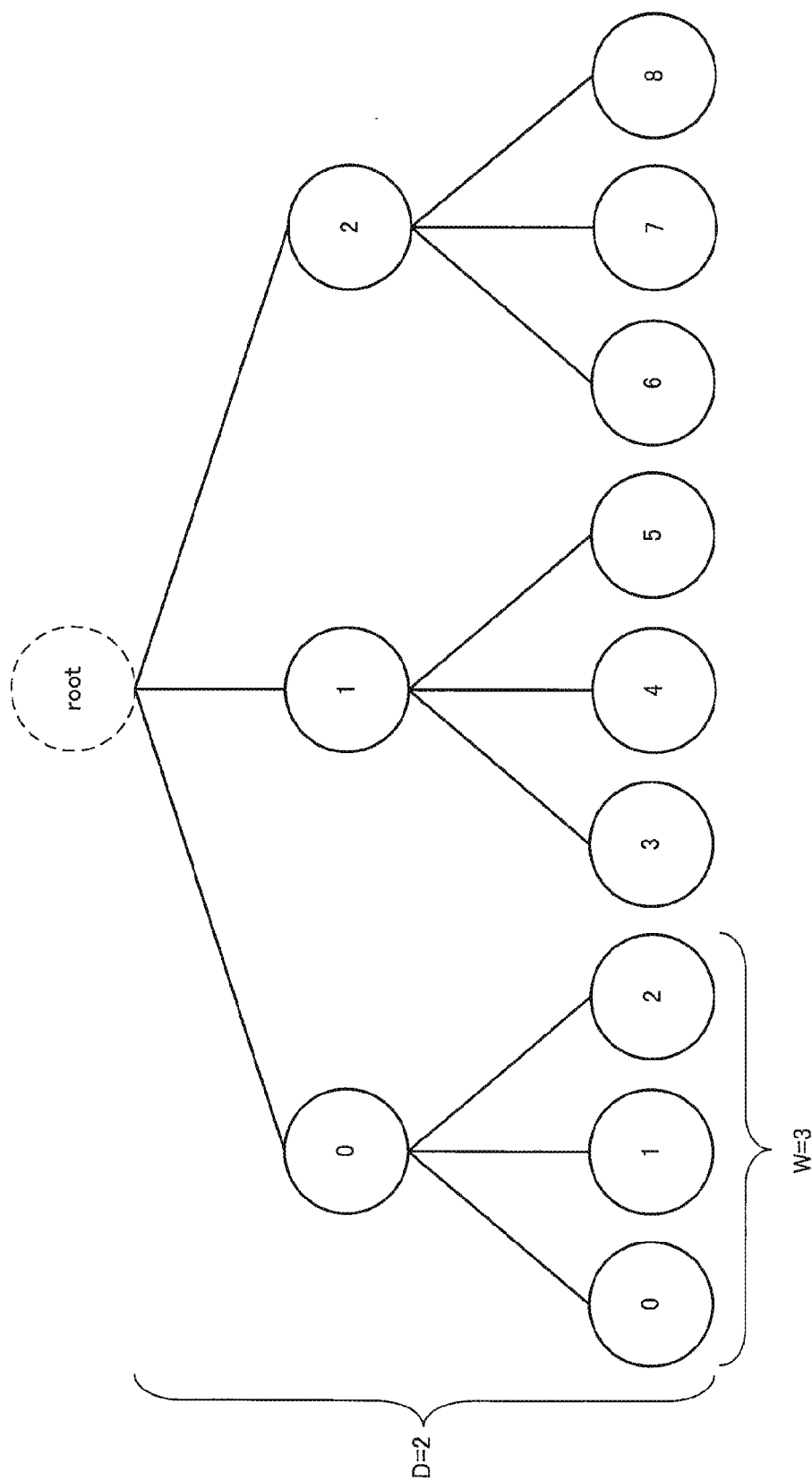
FIG. 11 is a diagram illustrating an exemplary topic tree with W=3 and D=2.

When the higher-level-constraint buffer 107 is empty at this point in time, the higher-level-constraint-attached topic estimation unit 103 performs the same processing performed by the topic estimation unit 502 illustrated in FIG. 9 (steps n1 to n3 in FIG. 10) to perform ordinary topic estimation. When a higher-level constraint is in the higher-level-constraint buffer 107, the higher-level-constraint-attached topic estimation unit 103 performs estimation processing so that each word is assigned only to topics that satisfy the higher-level constraint in the latent topic estimation for the word.

The determination as to whether a topic satisfies a higher-level constraint or not is made on the basis of whether or not the parent topic of that topic in the topic tree is included in the higher-level constraint. Specifically, the determination is made on the basis of whether or not the topic ID divided by W is included in the higher-level constraint. For example, consider topic estimation where W=4 and the number of topics is 16. If the higher-level constraint for a given word (assignment in estimation for 4 topics) is 0, 2, eight topics {0, 1, 2, 3, 8, 9, 10, 11} among topics 0 to 16 satisfy the hither-level constraint. A topic that satisfies a higher-level constraint is hereinafter referred to as an allowable topic and a list of allowable topics is referred to as allowable topic list.

Figure 3:
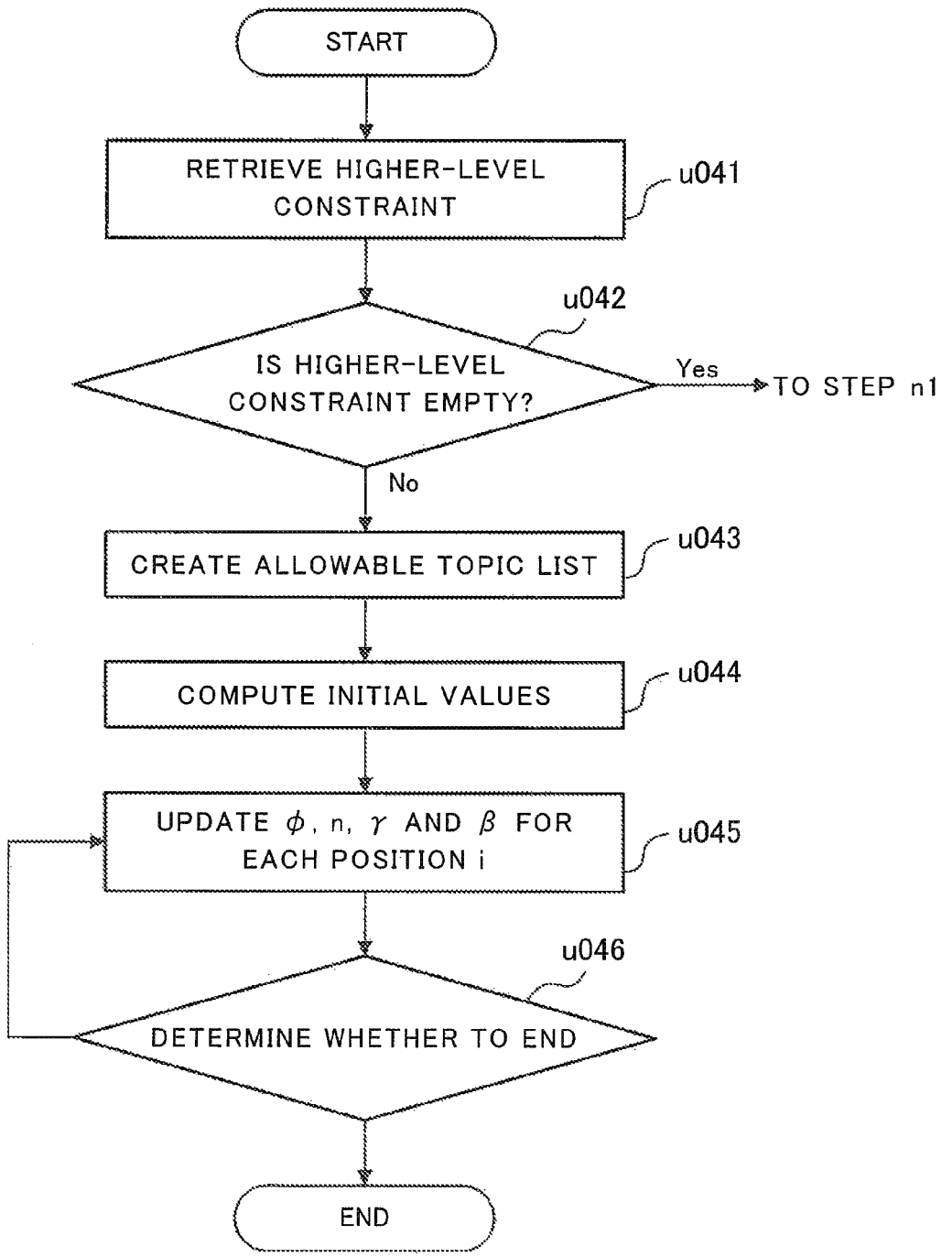
FIG. 3 is a flowchart illustrating higher-level-constraint-attached topic estimation processing in the flow of adding document data.

FIG. 3 is a flowchart illustrating a higher-level-constraint-attached topic estimation processing in the flow of adding document data, i.e. the processing at step u04 in FIG. 2. The processing at step u04 will be described in detail with reference to FIG. 3.

When a document j made up of N_{j} words is added, the higher-level-constraint-attached topic estimation unit 103 first refers to the higher-level-constraint buffer 107 to obtain a higher-level constraint for every position in the document (step u041). When the higher-level-constraint buffer 107 is empty (Yes at step u042), the higher-level-constraint-attached topic estimation unit 103 proceeds to the processing at step n1 illustrated in FIG. 10 and performs the processing from step n1 to n3. Upon completion of the ordinary topic estimation processing, the higher-level-constraint-attached topic estimation unit 103 ends the processing; otherwise (No at step u042), the higher-level-constraint-attached topic estimation unit 103 proceeds to the processing at step u043.

At step u043, the higher-level-constraint-attached topic estimation unit 103 compares the topic ID at the higher level that is included in the higher-level constraint with each of topic IDs 0 to k−1 divided by W and generates an allowable topic list.

The higher-level-constraint-attached topic estimation unit 103 then computes initial values for the probability parameters (step u044). This processing is the same as the processing at step n1 illustrated in FIG. 10. To the initial value of $\phi\_\{j, i, t\}^{\{old\}}$ among the probability parameters, a probability may be randomly assigned only to allowable topics, rather than randomly assigning a probability to all topics, and 0 may be assigned to the topics other than allowable topics.

The higher-level-constraint-attached topic estimation unit 103 then updates the values of Equations 7, 2, 3 and 4 for each word in the document (step u045).

[Math. 9]

$$\phi_{j,i,t} = \begin{cases} \dfrac{\phi^{k/W}_{j,i,t/W}\beta^{k}_{t,w_{j,i}}\exp\left\{\psi\left(\gamma^{k}_{j,t}\right)-\psi\left(\sum_{t=i}^{T}\gamma^{k}_{j,t}\right)\right\}}{\sum_{t\in cons}\phi^{k/W}_{j,i,t/W}\beta^{k}_{t,w_{j,i}}\exp\left\{\psi\left(\gamma^{k}_{j,t}\right)-\psi\left(\sum_{t=i}^{T}\gamma^{k}_{j,t}\right)\right\}} & t\in cons \\ 0 & else \end{cases} \quad (\text{Eq. 7})$$

Note that the update processing is performed only for the topics that satisfy the higher-level constraint. This process is accomplished by updating $\phi\_\{j, i, t\}^{\{k\}}$, $\beta\_\{t, v\}^{\{k\}}$, $n\_[j, t]^{\{k\}}$, $n\_\{j, t, v\}^{\{k\}}$ and $\gamma\_\{j, t\}^{\{k\}}$ in order by using Equations 7, 2, 3 and 4.

Note that cons in Equation 7 represents a set of IDs of allowable topics. $\phi\_\{j, i\ t/W\}^{\{k/W\}}$ represents the document word topic probability of a parent topic included in the higher-level constraint. Equation 7 differs from Equation 1 in that the provability values of topics other than the allowable topics are fixed at 0 in Equation 7 and that the document word topic probability $\phi\_\{j, i, t/W\}^{\{k/W\}}$ of the parent topic is used as a weight in Equation 7. Equation 7 enables probability assignment that takes into consideration the result of probability estimation for k/W topics in the probability estimation for k topics Upon completion of the update processing for all of the words in document j, the higher-level-constraint-attached topic estimation unit 103 replaces $\phi\_\{j, i, t\}^{\{old\}}$, $n\_\{j, t\}^{\{old\}}$, and $n\_\{j, t, v\}^{\{old\}}$ with the values $\phi\_\{j, i,$ $t\}^{\{k\}}$, $n\_\{j, t\}^{\{k\}}$, and $n\_\{j, t, v\}^{\{k\}}$ computed in the current topic estimation in preparation for next update processing.

Upon completion of the processing described above, the higher-level-constraint topic estimation unit 103 performs determination processing at step n046 as to whether to end the processing. This processing is the same as the processing at step n3 illustrated in FIG. 10. Upon completion of the estimation processing for the topics that satisfy the higher-level constraint, the word latent topic estimation device proceeds to the processing at step u05.

At step u05, the data update unit 104 updates the values in the topic distribution storage unit 106 on the basis of the number of word topics $n\_\{j, t, v\}^{\{k\}}$ among the values computed by the higher-level-constraint-attached topic estimation unit 103. The update is performed according to Equation 5.

When the processing by the data update unit 104 ends, the higher-level constraint creation unit 105 creates a higher-level constraint on the basis of the document word topic probabilities $\phi$ computed by the higher-level-constraint-attached topic estimation unit 103 (step u06). The processing is performed as follows.

First, the higher-level constraint creation unit 105 clears the higher-level-constraint buffer 107 at this point in time.

Then, the higher-level constraint creation unit 105 performs the following processing for each word. The higher-level constraint creation unit 105 checks the document word topic probabilities $\phi\_\{j, i, t\}^{\{k\}}$ for the i-th word in document j for t=0 to k−1 in order. The higher-level constraint creation unit 105 extract the IDs of topics that have document word topic probabilities greater than a threshold value TOPIC_MIN (for example 0.2) and adds the IDs to the allowable topic list cons(j, i).

The higher-level constraint creation unit 105 then updates the values of $\phi\_\{j, i, t\}^{\{k\}}$ for t in the allowable topic list according to Equation 8. The higher-level constraint creation unit 105 then adds the IDs of the topics included in cons(j, i) and $\phi\_\{j, i, t\}^{\{k\}}$ for the topics in the higher-constraint buffer 107.

[Math. 10]

$$\phi_{j,i,t} = \begin{cases} \dfrac{\phi^{k}_{j,i,t}}{\sum_{t\in cons(j,i)}\phi^{k}_{j,i,t}} & t\in cons(j, i) \\ 0 & else \end{cases} \quad (\text{Eq. 8})$$

When the higher-level constraint creation unit 105 completes the processing described above for all positions in document j, the word latent topic estimation device returns to the processing at step u02 and performs the processing at the next level.

The output flow will be described next. The output flow is started when the word topic distribution output unit 108 is called by a user operation or an external program. The word topic distribution output unit 108 computes a word topic probability for each topic t for all words v at each number of topics k by using Equation 6 on the basis of data stored in the topic distribution storage unit 106 and outputs the word topic probabilities.

An operation of this exemplary embodiment will be described using a specific example. In this example, the word latent topic estimation device performs hierarchical latent topic estimation with W=4 and D=2. It is assumed that the following parameter have been set beforehand.

$\lambda\_\{0\}=1/100$ $\alpha\_\{t\}^\{k\}=0$ ($t$∈topic tree, $k$∈{4,16})

TOPIC_MIN=0.2

It is also assumed that 1000 documents have already been added and the following data has been stored in the topic distribution storage unit 106.
children: 4: 0→100
children: 4: 1→50
children: 4: 2→5
children: 4: 3→5

A flow of adding document data performed when a document 555 made up of only two words, "children" and "year", is added to the document data addition unit 101 will be described.

When the document data is added, the level setting unit 102 sets the number of topics k=4 (step u01, step u02). The level setting unit 102 determines at step u03 whether or not to end the processing. Since k (=4)<W^D (=16), the word latent topic estimation device proceeds to the processing at step u04. At step u04, latent estimation is performed for 4 topics. Since the higher-level constraint buffer 107 is empty at this point in time, the same repetitive processing as that performed by the topic estimation unit 502 illustrated in FIG. 9 is performed at steps u04 and u05.

The description of the computation will be omitted here and it is assumed that the following results have been obtained.
The document word topic probabilities for "children" at position 0
$\phi\_\{555, 0, 0\}^\{4\}=0.8$
$\phi\_\{555, 0, 1\}^\{4\}=0.1$
$\phi\_\{555, 0, 2\}^\{4\}=0.01$
$\phi\_\{555, 0, 3\}^\{4\}=0.09$
The document word topic probabilities for "year" at position 1
$\phi\_\{555, 1, 0\}^\{4\}=0.01$
$\phi\_\{555, 1, 1\}^\{4\}=0.225$
$\phi\_\{555, 1, 2\}^\{4\}=0.675$
$\phi\_\{555, 1, 3\}^\{4\}=0.09$ At step u06, the higher-level constraint creation unit 105 creates a constraint for the lower level on the basis of these probabilities $\phi$. The processing will be described.

First, among the document word topic probabilities $\phi\_\{555, 0, t\}^\{4\}$ for "children" at position 0, only $\phi\_\{555, 0, 0\}4=0.8$ has a value greater than TOPIC_MIN(=0.2). Accordingly, only 0 is added to the allowable topic list cons(555, 0). The higher-level constraint creation unit 105 updates $\phi\_\{555, 0, 0\}^\{4\}$ to 1 according to Equation 8. As a result, the higher-level constraint creation unit 105 adds the following higher-level constraint to the higher-level constraint buffer 107.
0→0: 1

Next, among the document word topic probabilities $\phi\_\{555, 1, t\}^\{4\}$ for "year" at position 1, the following two document word topic probabilities have values equal to or greater than TOPIC_MIN (0.2).
$\phi\_\{555, 1, 1\}^\{4\}=0.225$
$\phi\_\{555, 1, 2\}^\{4\}=0.675$ Therefore, {1, 2} is added to the allowable topic list cons(555, 1). The higher-level constraint creation unit 105 updates the values of $\phi\_\{555, 1, 1\}^\{4\}$ and $\phi\_\{555, 1, 2\}^\{4\}$ according to Equation 8 as follows.

$\phi\_\{555, 1, 1\}^\{4\}=0.225/(0.225+0.675)=0.25$
$\phi\_\{555, 2, 2\}^\{4\}=0.675/(0.225+0.675)=0.75$ As a result, the higher-level constraint creation unit 105 adds the following higher-level constraint to the higher-level constraint buffer 107.
1→1: 0.25, 2: 0.75

When the creation of the higher-level constraint is completed, the word latent topic estimation device returns to step u02, where the number of topics k is updated to 16 (step u02). Since "k=16" does not satisfy the end condition at step u03, the word latent topic estimation device proceeds to step u04, i.e. the processing by the higher-level constraint-attached topic estimation 103.

The higher-level-constraint-attached topic estimation unit 103 first retrieves the following data from the higher-level constraint buffer 107 at step u041.
0→0: 1
1→1: 0.25, 2: 0.75

The higher-level-constraint-attached topic estimation unit 103 then generates an allowable topic list at each position for each word at step u043. For position 0, the higher-level constraint topic is 0, therefore the number that gives 0 when divided by W is chosen from among 0 to 15 to generate an allowable topic list {0, 1, 2, 3}. For position 1, the higher-level constraint topic is {1, 2}, therefore the number that gives 1 when divided by W and the number that gives 2 when divided by W are chosen from among 0 to 15 to list {4, 5, 6, 7} and {8, 9, 10, 11}, from which an allowable topic list {4, 5, 6, 7, 8, 9, 10, 11} is generated. The higher-level-constraint-attached topic estimation unit 103 computes initial values of $\phi$, $\gamma$, $\beta$ and n (step u044).

The higher-level-constraint-attached topic estimation unit 103 then performs processing for updating $\phi$, $\gamma$, $\beta$ and n that correspond to the topics in the allowable topic lists (step u045). The description here focuses on computation of $\phi\_\{555, i, t\}^\{16\}$. For simplicity, it is assumed that the term base$\_\{j, i, t\}^\{k\}$ given by Equation 9 has been computed as follows.
base$\_\{555, i, t\}^\{16\}=1/16$ (i=0, 1; t=0 to 15)

[Math. 11]

$$\text{base}_{j,i,t}^{k} = \beta_{t,w_{j,i}}^{k} \exp\left\{\psi\left(\gamma_{j,t}^{k} - \psi\left(\sum_{t=i}^{T} \gamma_{j,t}^{k}\right)\right)\right\} \quad \text{(Eq. 9)}$$

For the word "children" at position 0, the computation is performed as follows. From the higher-level constraint 0→0: 1, the document word topic probabilities $\phi\_\{555, 0, t\}^\{4\}$ at the higher level can be considered as follows.
$\phi\_\{555, 0, 0\}^\{4\}=1$
$\phi\_\{555, 0, 1\}^\{4\}=0$
$\phi\_\{555, 0, 2\}^\{4\}=0$
$\phi\_\{555, 0, 3\}^\{4\}=0$ Allowable topics are 0 to 3 and the subsequent computations need to be performed only for topics 0 to 3. Specifically, in the computation of $\phi\_\{555, 0, 0\}^\{16\}$, only the following computations are performed.
$\phi\_\{555, 0, 0\}^\{4\}$ multiplied by base$\_\{555, 0, 0\}^\{16\}=1/16$
$\phi\_\{555, 0, 0\}^\{4\}$ multiplied by base$\_\{555, 0, 1\}^\{16\}=1/16$
$\phi\_\{555, 0, 0\}^\{4\}$ multiplied by base$\_\{555, 0, 2\}^\{16\}=1/16$
$\phi\_\{555, 0, 0\}^\{4\}$ multiplied by base$\_\{555, 0, 3\}^\{16\}=1/16$ Computations beyond the above can be ignored because $\phi\_\{555, 0, 1\}^\{4\}$, $\phi\_\{555, 0, 2\}^\{4\}$, and $\phi\_\{555, 0, 3\}^\{4\}$ are 0. $\phi\_\{555, 0, t\}^\{16\}$ is computed as follows.

$\phi\_\{555, 0, 0\}\^\{16\} = \frac{1}{4}$
$\phi\_\{555, 0, 1\}\^\{16\} = \frac{1}{4}$
$\phi\_\{555, 0, 2\}\^\{16\} = \frac{1}{4}$
$\phi\_\{555, 0, 3\}\^\{16\} = \frac{1}{4}$
$\phi\_\{555, 0, t\}\^\{16\} = 0$ (4≤t<16)

In this way, the use of the result of estimation for 4 topics as a higher-level constraint can reduce the number of updates of φ required for each topic. Specifically, the number of computations required for ordinary latent topic estimation for 16 topics is 16 topics×number of iterations. In contrast, when a higher-level constraint created from the result of estimation for k=1 is used, only (4 higher-level topics+4 lower-level topics)×number of iterations are required for "children" at position 0.

Computations for the word "year" at position 1 are performed next. Again, the description focuses on the computation of φ. Since the higher-level constraint for position 1 is "1→1: 0.25, 2: 0.75", the document word topic probabilities φ_{555, 1, t}^{4} at the higher level can be considered as follows.

$\phi\_\{555, 0, 0\}\^\{4\} = 0$
$\phi\_\{555, 1, 1\}\^\{4\} = 0.25$ (=¼)
$\phi\_\{555, 2, 2\}\^\{4\} = 0.75$ (¾)
$\phi\_\{555, 3, 3\}\^\{4\} = 0$ Computations beyond the above are performed only for the allowable topics {4, 5, 6, 7, 8, 9, 10, 11}. Specifically, in the computation of φ_{555, 1, 0}^{16}, only the following computations are performed.

$\phi\_\{555, 1, 1\}\^\{4\}$ multiplied by base_{555, 1, 4}^{16} = 1/64
$\phi\_\{555, 1, 1\}\^\{4\}$ multiplied by base_{555, 1, 5}^{16} = 1/64
$\phi\_\{555, 1, 1\}\^\{4\}$ multiplied by base_{555, 1, 6}^{16} = 1/64
$\phi\_\{555, 1, 1\}\^\{4\}$ multiplied by base_{555, 1, 7}^{16} = 1/64
$\phi\_\{555, 1, 2\}\^\{4\}$ multiplied by base_{555, 1, 8}^{16} = 3/64
$\phi\_\{555, 1, 2\}\^\{4\}$ multiplied by base_{555, 1, 9}^{16} = 3/64
$\phi\_\{555, 1, 2\}\^\{4\}$ multiplied by base_{555, 1, 10}^{16} = 3/64
$\phi\_\{555, 1, 2\}\^\{4\}$ multiplied by base_{555, 1, 11}^{16} = 3/64

$\phi\_\{555, 1, t\}\^\{16\}$ is computed as follows.
$\phi\_\{555, 1, 4\}\^\{16\} = 1/16$
$\phi\_\{555, 1, 5\}\^\{16\} = 1/16$
$\phi\_\{555, 1, 6\}\^\{16\} = 1/16$
$\phi\_\{555, 1, 7\}\^\{16\} = 1/16$
$\phi\_\{555, 1, 8\}\^\{16\} = 3/16$
$\phi\_\{555, 1, 9\}\^\{16\} = 3/16$
$\phi\_\{555, 1, 10\}\^\{16\} = 3/16$
$\phi\_\{555, 1, 11\}\^\{16\} = 3/16$
$\phi\_\{555, 1, t\}\^\{16\} = 0$ (t<4 or t>12)

As with the computation for "children" at position 0, the conventional method requires 16 computations of φ whereas the computation method described above requires only 4+8=12 computations of φ to complete the processing. The same computation method can be applied to processing for updating γ, β and n to achieve the same advantageous effect.

The processing is followed by the processing at step u05 to u06 and then the level setting unit 102 updates k to 64 at step u02. Since this result in k>16, the termination processing at step u07 is performed and the processing flow ends.

As has been described above, a higher-level constraint enables topic estimation to be hierarchically performed without performing estimation processing for excess topics while taking into consideration the probabilities of a mixture of multiple topics. For example, when estimation is performed for 100 topics, ordinary latent topic estimation requires estimation for 100 topics for each word. On the other hand, the latent topic estimation according to the present invention requires estimation for only 10 to several tens of topics for each word when, for example D=2 and W=10 are set, and thus enables efficient estimation.

Second Exemplary Embodiment

A second exemplary embodiment of the present invention will be described with reference to drawings.

Figure 4:
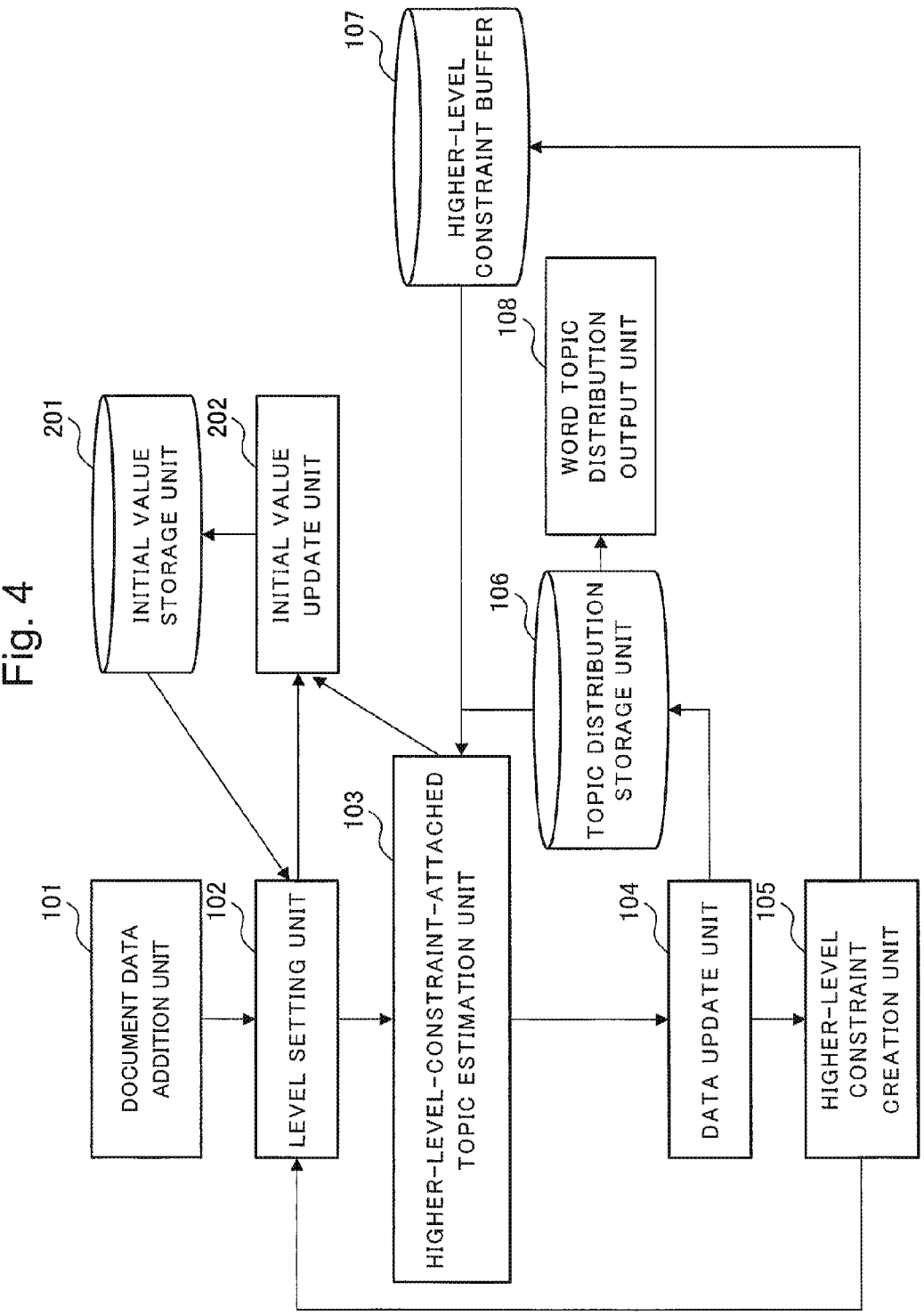
FIG. 4 is a block diagram illustrating an exemplary configuration of a word latent topic estimation device in a second exemplary embodiment according to the present invention.

FIG. 4 is a block diagram illustrating an exemplary configuration of a word latent topic estimation device in the second exemplary embodiment according to the present invention. As illustrated in FIG. 4, the word latent topic estimation device of the second exemplary embodiment includes an initial value storage unit 201 and an initial value update unit 202 in addition to the components of the first exemplary embodiment.

The initial value storage unit 201 stores an initial value of the number of topics k set by a level setting unit 102. Specifically, the initial value storage unit 201 stores the initial value initK of k. It is assumed that initK has been set to $W\^\{(D-1)\}$ before addition of a document.

The initial value update unit 202 is called by the level setting unit 102 and updates the initial value of the number of topics k in the initial value storage unit 201 on the basis of a document word topic probability computed by a higher-level-constraint-attached topic estimation unit 103 and the number of documents that have been added.

Note that the initial value update unit 202 is implemented by a CPU or the like of the word latent topic estimation device. The initial value storage unit 201 is implemented by a storage device such as a memory of the word latent topic estimation device, for example.

The other components in the second exemplary embodiment are the same as those in the first exemplary embodiment and therefore the description of those components will be omitted.

An operation of this exemplary embodiment will be described below.

Figure 5:
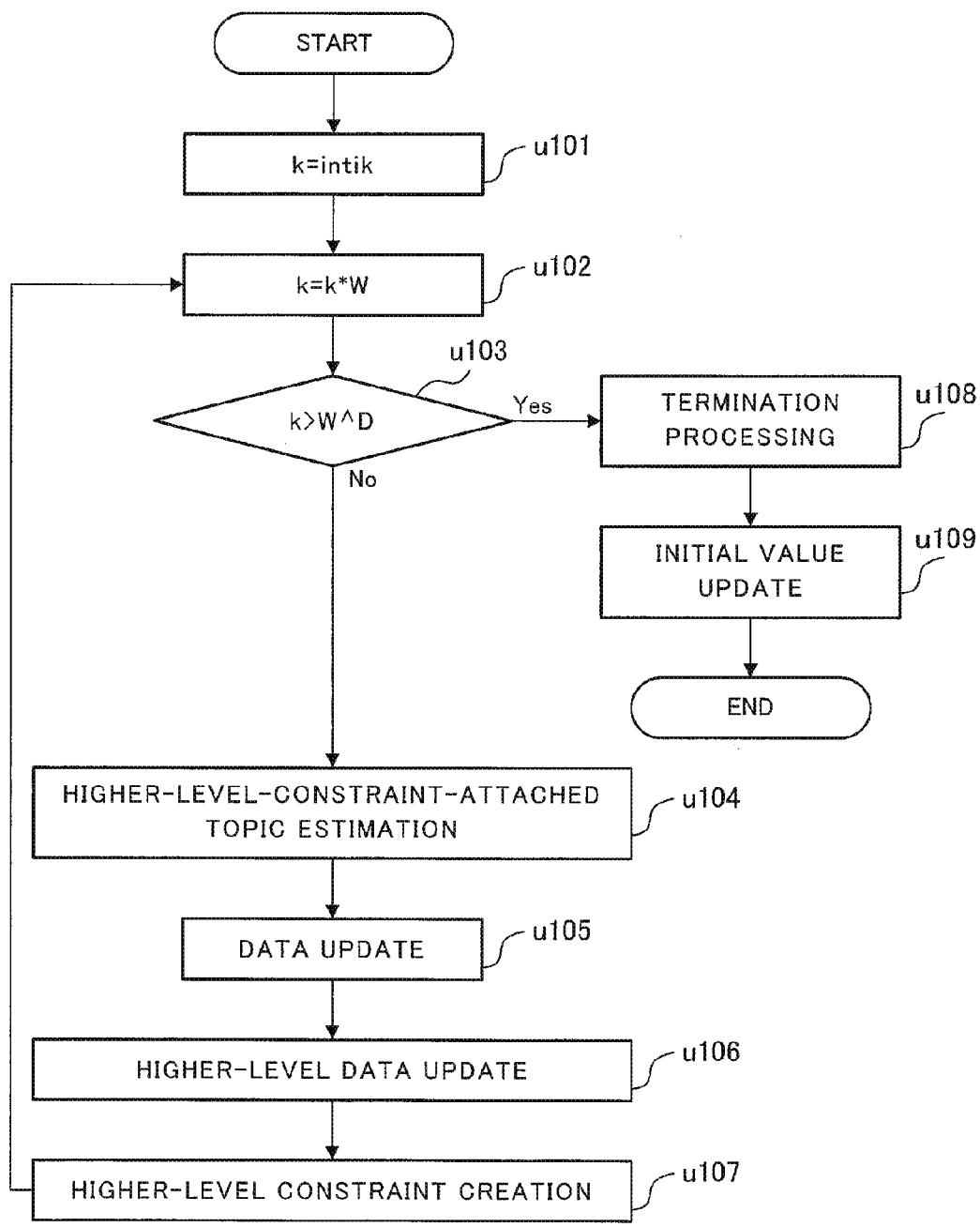
FIG. 5 is a flowchart illustrating a flow of adding document data in the second exemplary embodiment.

A flow of adding document data in the second exemplary embodiment will be described here. FIG. 5 is a flowchart of the flow of adding document data in the second exemplary embodiment.

The flow of adding document data in the second exemplary embodiment is started when document data including one or more words is input by a user operation or an external program. When document data is added, first the level setting unit 102 retrieves the initial value initK of k from the initial value storage unit 201 and sets the value as the initial value of k (step u101). The subsequent processing (steps u102 to u105) is the same as the processing at step u02 to u05 of the first exemplary embodiment.

Then, at step u106, a data update unit 104 updates a higher-level topic with the number of word topics n_{j, t, v}^{k} for each word. This processing is performed only when K is not equal to W and k=initK*W. The reason is as follows. When k=W, there is no higher-level topics and therefore the processing is unnecessary. When k is not equal to initK*W, assignment to a higher-level topic for the document is performed in k/W topic estimation and therefore the processing does not need to be performed here.

Figure 6:
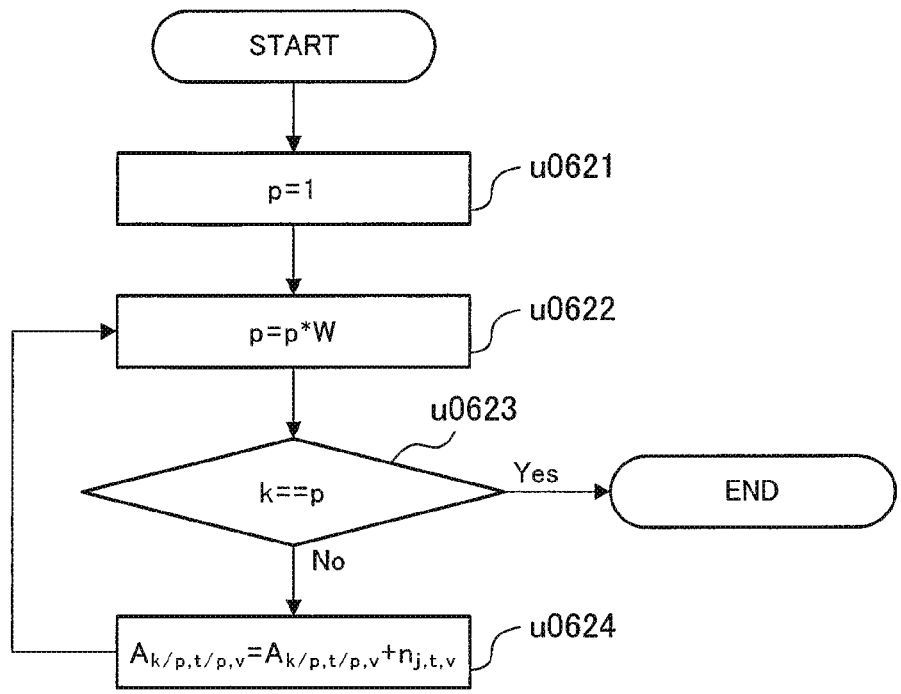
FIG. 6 is a flowchart illustrating processing for assigning the number of topics to higher-level topics by a data update unit.

FIG. 6 is a flowchart illustrating the processing at step u106, i.e. processing for assigning the number of word topics to a higher-level topic by the data update unit 104. Assignment of the number of word topics n_{j, t, v} to the higher-level topic is performed in accordance with the processing flow in FIG. 6.

As illustrated in FIG. 6, first the initial value of parameter p is set to 1 (step u0621). Then the value of p is updated to p multiplied by W (step u0622). The data update unit 104 compares the current k with p and, if k is equal to p (Yes at step u0623), ends the processing; otherwise (No at step u0623), the data update unit 104 adds n_{j, t, v} to A_{k/p, t/p, v} for the higher-level topic to update data in a topic distribution storage unit 106 (step u0624).

The processing at step u0624 is performed for each t. For example, if W=4, D=4, initK=16 and k=64, the value n_{j, 18, v} of topic ID=18 is added to A_{16, 4, v} where k=16 (=64/4) and t=4(=18/4) and to A_{4, 1, v} where k=4 (=64/16) and t=1 (=18/16).

When the data update unit 104 ends the process at step u106, the word latent topic estimation device performs the higher-level constraint creation processing at step u107 and then proceeds to the termination processing (step u108). These processing steps are the same as those of the flow of adding document data in the first exemplary embodiment. However, in the flow of adding document data in this exemplary embodiment, the initial value update unit 202 is called after the level setting unit 102 has performed the termination processing.

The initial value update unit 202 updates the initial value initK of the number of topics k in the initial value storage unit 201 in preparation for the next and subsequent documents (step u109). How much computation can be reduced by performing filtering at the higher-level after estimation for a lower-level topic is calculated here and initK is set to a small value in accordance with the reduction effect. The reduction effect E can be calculated according to the following equation.

$$E = n\text{Cost}(\text{init}K*W) - 1 \cdot \text{upCost}(\text{init}K*W)$$

The function nCost(k) represents the amount of computation required when latent topic estimation for k topics is performed by an ordinary computation method and can be computed according to Equation 10.

[Math. 12]

$$n\text{Cost}(k) = k \cdot \text{len}_j \quad \text{(Eq 10)}$$

In Equation 10, len_{j} represents the number of words included in document j. When initK is used without change, the number of topics k is equal to initK*W and the topic estimation requires the amount of computation that is equal to the number of words included in document j multiplied by k.

The function upCost(K) represents the amount of computation required when latent topic estimation for k/W topics at one level higher is performed and then a higher-level constraint obtained as a result of the latent estimation is used. upCost(k) can be computed according to Equation 11.

[Math. 13]

$$\text{upCost}(k) = n\text{Cost}(k/W) + F(k/W) \quad \text{(Eq. 11)}$$

The first term of Equation 11 represents the amount of computation required for performing latent topic estimation at one level higher, i.e. latent topic estimation for k/W topics. The second term F(k) represents the amount of computation required for performing latent topic estimation for k*W topics by using a higher-level constraint created in latent topic estimation for k topics. F(k) can be computed according to Equation 12.

[Math. 14]

$$F(k) = \sum_{i,t}^{i<\text{len}_j, t<k} W \cdot I(\phi_{j,i,t}^k > \text{TOPIC\_MIN}) \quad \text{(Eq. 12)}$$

In order to compute F(k/W) in Equation 11, $\phi\_\{j, i, t\}^{\{k/W\}}$ is required in topic estimation at one level higher. The value can be calculated according to Equation 13 from the value of $\phi\_\{j, i, t\}^{\{k\}}$ computed by the higher-level-constraint-attached topic estimation unit 103. In the Equation, the function c(p) represents a set of topics that are child topics of topic p in the topic tree.

[Math. 15]

$$\phi_{j,i,p}^{(k/W)} = \sum_{t \in c(p)} \phi_{j,i,t}^k \quad \text{(Eq. 13)}$$

The initial value update unit 202 computes E and, when E is greater than a threshold value E_MIN (for example 0), updates initK in the initial value storage unit 201 to initK/W.

Note that while the reduction effect has been calculated in order to update the initial value initK, initK may be updated in accordance with the number of documents that have been added if what degree of reduction effect can be achieved by adding how many documents can be empirically established. For example, initK may be updated to initK/W when the number of documents that have been added reaches 10000 or more. According to such a method, determination as to which of hierarchical topic estimation and ordinary topic estimation, i.e. topic estimation for all topics is to be performed can be made on the basis of only on the number of documents.

While the reduction effect E is calculated each time a document is added, the reduction effect E may be calculated when the number of documents that have added reaches X rather than every time a document is added, thereby reducing the processing time required for calculating the reduction effect E.

While determination is made as to whether or not to update initK on the basis of reduction effect E for one document, the mean of reduction effects E for a plurality of documents, for example Y documents, mean(E), may be calculated and, when the mean exceeds a threshold value E_MIN, initK may be updated.

An operation of this exemplary embodiment will be described with a specific example. In this example, a document 300 made up only of "school" and "children" is added in a situation where W=4 and D=2 and initK is not set in the initial value storage unit 201. When document data is added, the level setting unit 102 first refers to the initial value storage unit 201 and retrieves initK (=W^(D−1))=4 (step u101). As a result, the number of topics k=16 is set at step u102 and estimation processing for 16 topics is performed at step u104. It is assumed here that as a result, the following φ and n have been obtained.

φ_{300, i, t}^{16}=1/16 (i=0, 1; 0≤t<16)
n_{300, t, "school"}^{16}=1/16 (0≤t<16)
n_{300, t, "children"}^{16}=1/16 (0≤t<16)

After the processing at step u105, the data update unit 104 performs the processing at step u106.

First, processing for "school" will be described. As a result of processing at steps u0621 and u0622, p=4 is set.

Since k (=16) is not equal to p, the data update unit 104 proceeds to the processing at step u0624. At step u0624, the data update unit 104 performs the following computations for 0≤=t<16.

Add n_{300, 0, "school"}^{16} to A_{4, 0, "school"}
Add n_{300, 1, "school"}^{16} to A_{4, 0, "school"}
Add n_{300, 2, "school"}^{16} to A_{4, 0, "school"}
Add n_{300, 3, "school"}^{16} to A_{4, 0, "school"}
Add n_{300, 4, "school"}^{16} to A_{4, 1, "school"}
Add n_{300, 5, "school"}^{16} to A_{4, 1, "school"}
Add n_{300, 6, "school"}^{16} to A_{4, 1, "school"}

Then, the data update unit 104 returns to the processing at step u0622, where p=16 is set. Since the value is equal to k (=16), the processing ends.

Topic estimation for higher-level topics is not performed in an early stage of learning in the second exemplary embodiment. However, the processing enables the number of word topics in a parent topic to be computed. Accordingly, word topic probabilities can be computed without decreasing the degree of accuracy when topic estimation for topics at the higher level is started. When the data update unit 104 has completed the processing at step u106, step u107 is performed and the flow proceeds to termination processing (step u108). Then the initial value update unit 202 determines whether or not to update initK.

The processing at step u109 will now be described. At step u109, on the basis of φ_{300, i, t}^{16}=1/16 (i=0, 1; 0≤t<16), the reduction effect E is computed as nCost(16)−upCost(16). To compute the value, the initial value update unit 202 first computes φ_{300, i, t}^{4} from φ_{300, i, t}^{16} according to Equation 13.

This gives the following results.
φ_{300, i, t}^{4}=¼ (i=0, 1; 0≤t<4)

Since these values are all equal to or greater than TOPIC_MIN (0.2), the function I in Equation 12 returns 1. Thus the amount of computation F(4) when the higher-level constraint is used is found to be 32.

Therefore, nCost(16) is k×len_{300}=16×2=32 according to Equation 10. From Equation 11, upCost(16) is 8+32=40. The reduction effect E is 32−4=−8, a negative value. This means that the number of updates of φ required in topic estimation for 16 topics using the higher-level constraint of 4 topics is 8 more than the number of updates required in simple topic estimation for 16 topics and therefore reduction effect cannot be achieved. Therefore, the initial value update unit 202 does not update initK.

On the other hand, assume that φ_{300, i, t}^{16} estimated by the higher-level-constraint topic estimation unit 103 has the following values.
φ_{300, 0, 0}^{16}=7/28
φ_{300, 0, 15}^{16}=7/28
φ_{300, 0, t}^{16}=1/28 (1≤t<15)
φ_{300, 1, 0}^{16}=7/28
φ_{300, 1, 1}^{16}=7/28
φ_{300, 1, t}^{16}=1/28 (2≤t)

Processing at step u109 performed in this case will be described. The initial value update unit 202 first computes φ_{300, i, t}^{4} according to Equation 13. The computation yields the following results.
φ_{300, 0, 0}^{4}=10/28
φ_{300, 0, 1}^{4}=4/28
φ_{300, 0, 2}^{4}=4/28
φ_{300, 0, 3}^{4}=10/28
φ_{300, 1, 0}^{4}=16/28
φ_{300, 1, 1}^{4}=4/28
φ_{300, 1, 2}^{4}=4/28
φ_{300, 1, 3}^{4}=4/28

Since 4/28 among these results is less than or equal to TOPIC_MIN (0.2), the amount of computation F(4) when the higher-level constraint is used is computed as 3×4=12.

From Equation 10, nCost(16) is k×len_{300}=16×2=32. From Equation 11, upCost(16) is 8+12=20. The reduction effect E is 32−20=12. This means that the higher-level constraint for 4 topics can reduce the number of updates of φ by 12.

At this point in time, the initial value update unit 202 updates initK to 4/4=1. Thus, the processing speed for new documents can be increased by performing latent topic estimation for 4 topics in the next and subsequent estimation.

As has been described above, in this exemplary embodiment, the reduction effect E is calculated and the initial value initK of the number of topics k is set in accordance with the reduction effect E. This enables selection between ordinary topic estimation and hierarchical latent estimation in accordance with the reduction effect E.

In the first exemplary embodiment, a higher-level constraint is created on the basis of the result of estimation for a higher-level topic in hierarchical latent topic estimation, thereby reducing the amount of estimation for lower-level topics. However, when the amount of document data is small, the bias in the results of estimation for a higher-level topic is small. Accordingly, the reduction effect cannot be achieved relative to the cost required for estimation at the higher level and the processing time is likely to increase or the degree of accuracy is likely to decrease.

In contrast, according to this exemplary embodiment, ordinary topic estimation is performed and probabilities for all topics are computed in an early stage of learning where the amount of document data is small and, once a reduction effect has been confirmed, switching can be made to the hierarchical latent topic estimation. Accordingly, a decrease in the degree of accuracy and an increase in processing time in the early stage of learning can be avoided.

According to the present invention, latent topics in an information management system that manage text information can be dealt with to automatically extract characteristic word information fast without using a dictionary. Accordingly, the present invention enables efficient document summation and document search.

Figure 7:
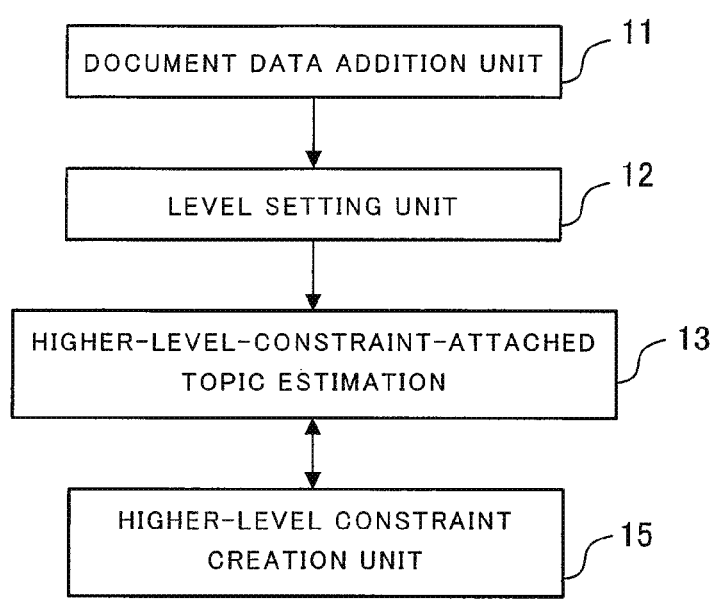
FIG. 7 is a block diagram illustrating a minimum configuration of a word latent topic estimation device according to the present invention.
Figure 8:
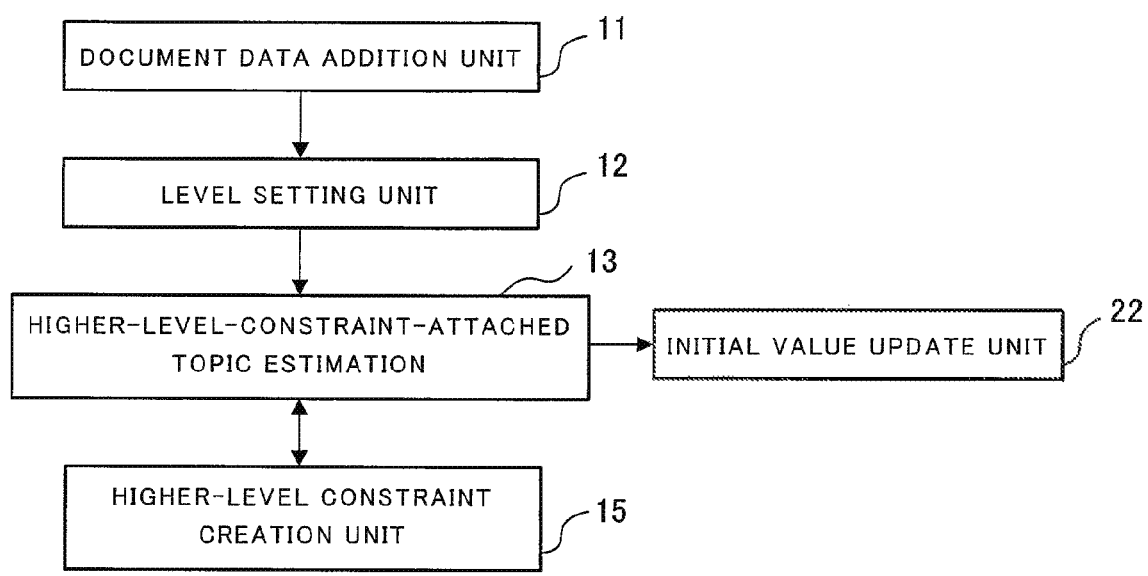
FIG. 8 is a block diagram illustrating another minimum configuration of a word latent topic estimation device according to the present invention.

FIG. 7 is a block diagram illustrating a minimum configuration of a word latent topic estimation device according to the present invention. FIG. 8 is a block diagram illustrating another minimum configuration of a word latent topic estimation device according to the present invention.

As illustrated in FIG. 7, the word latent topic estimation device according to the present invention includes a document data addition unit 11 (which is equivalent to the document data addition unit 101 illustrated in FIG. 1) which inputs a document including one or more words, a level setting unit 12 (which is equivalent to the level setting unit 102 illustrated in FIG. 1) which sets the number of topics at each level in accordance with a hierarchical structure for hierarchically estimating latent topics of a word, a higher-level constraint creation unit 15 (which is equivalent to the higher-level constraint creation unit 105 illustrated in FIG. 1) which creates, for each word in a document, a higher-level constraint indicating an identifier of a topic that is likely to be assigned to the word and the probability of the word being assigned to the topic, on the basis of a result of topic estimation at a given level, and a higher-level-constraint-attached topic estimation unit 13 (which is equivalent to the higher-level-constraint-attached topic estimation unit 13 illustrated in FIG. 1) which, when estimating the probability of each word being assigned to a topic in an input document, refers to the higher-level constraint and uses the probability of the word being assigned to a parent topic at the higher level as a weight to perform estimation processing for a lower-level topic.

The exemplary embodiments described above also disclose a word latent topic estimation device as described below.

(1) The probability of each word in the document being assigned to each topic at a given level is estimated and when the probability of a word being assigned to a topic is smaller than a preset threshold value, the higher-level constraint creation unit 15 corrects the probability to 0 and creates a higher-level constraint including an identifier of a topic having a probability greater than 0 and the corrected probability.

According to such a configuration, when estimating a topic to which each word will be assigned, assignment to all topics does not need to be taken into consideration while taking into consideration that topic generation in each document is a mixture of topics is based on a Dirichlet distribution. Accordingly, topics can be hierarchically estimated without performing estimation processing for excess topics and thus effective computation can be carried out.

(2) A word latent topic estimation device as illustrated in FIG. 8 which includes an initial value update unit 22 (which is equivalent to the initial value update unit 202 illustrated in FIG. 4) which, after the higher-level-constraint-attached topic estimation unit 13 performs hierarchical topic estimation, computes the amount of computation when the current initial value of the number of topics is used without change and the amount of computation when the initial value of the number of topics is reduced and, when the difference between the amounts of computation is greater than a predetermined threshold value, reduces the initial value of the number of topics.

According to such a configuration, how much computation can be reduced can be calculated and selection can be made between ordinary topic estimation and hierarchical latent topic estimation in accordance with the reduction effect E. Thus, a decrease in the degree of accuracy and an increase in processing time in an early stage of learning where the amount of document data is small can be avoided.

(3) A word latent topic estimation device as illustrated in FIG. 8 which includes an initial value update unit 22 which counts the number of added documents and, when the counted number of documents is smaller than a predetermined threshold value, sets an initial value of the number of topics so that topic estimation for all topics is performed rather than the hierarchical topic estimation.

According to such a configuration, selection between hierarchical topic estimation and ordinary topic estimation, i.e. topic estimation for all topics, can be made on the basis of only the number of documents. Thus, the reduction effect does not need to be calculated and the processing load can be reduced.

This application is based upon and claims the benefit of priority from Japanese Patent Application No. 2012-169986 filed on Jul. 31, 2012, the entire disclosure of which is incorporated herein.

While the present invention has been described with respect to exemplary embodiments thereof, the present invention is not limited to the exemplary embodiments described above. Various modifications that are apparent to those skilled in the art can be made to configurations and details of the present invention within the scope of the present invention.

REFERENCE SIGNS LIST 11, 101, 501 . . . Document data addition unit
12, 102 . . . Level setting unit
13, 103 . . . Higher-level-constraint-attached topic estimation unit
15, 105 . . . Higher-level constraint creation unit
22, 202 . . . Initial value update unit
104, 503 . . . Data update unit
106, 504 . . . Topic distribution storage unit
107 . . . Higher-level constraint buffer
108, 505 . . . Word topic distribution output unit
201 . . . Initial value storage unit
502 . . . Topic estimation unit

What is claimed is:

1. word latent topic estimation device for estimating a probabilistic word latent topic sequentially each time a document is added, comprising:
a document data addition unit that inputs a document including one or more words;
a level setting unit that sets the number of topics at each level in accordance with a hierarchical structure of topics for hierarchically estimating a latent topic of a word, the hierarchical structure constituted with a preset width and a preset depth;
a higher-level constraint creation unit that creates a higher-level constraint for a word in the document on the basis of a result of topic estimation at a given level, the higher-level constraint indicating an identifier of a topic that is likely to be assigned to the word and the probability of the word being assigned to the topic; and
a higher-level-constraint-attached topic estimation unit which, when estimating the probability of each word in the input document being assigned to each topic, refers to the higher-level constraint which is created by the higher-level constraint creation unit and uses the probability of the word being assigned to a parent topic at a higher level as a weight to perform estimation processing for a lower-level topic.

2. The word latent topic estimation device according to claim 1,
wherein the probability of each word in the document being assigned to each topic at a given level is estimated and when the probability of a word being assigned to a topic is smaller than a preset threshold value, the higher-level constraint creation unit corrects the probability to 0 and creates a higher-level constraint including an identifier of a topic having a probability greater than 0 and the corrected probability.

3. The word latent topic estimation device according to claim 1, further comprising an initial value update unit which, after the higher-level-constraint-attached topic estimation unit performs hierarchical topic estimation, computes the amount of computation when the current initial value of the number of topics is used without change and the amount of computation when the initial value of the number of topics is reduced and, when the difference between the amounts of computation is greater than a predetermined threshold value, reduces the initial value of the number of topics.

4. The word latent topic estimation device according to claim 1, further comprising an initial value update unit which counts the number of added documents and, when the counted number of documents is smaller than a predetermined threshold value, sets an initial value of the number of topics so that topic estimation for all topics is performed rather than the hierarchical topic estimation.

5. A word latent topic estimation method for estimating a probabilistic word latent topic sequentially each time a document is added, comprising:

inputting, by a word latent topic estimation computing device, a document including one or more words;

setting, by the word latent topic estimation computing device, the number of topics at each level in accordance with a hierarchical structure of topics for hierarchically estimating a latent topic of a word, the hierarchical structure constituted with a preset width and a preset depth;

creating, by the word latent topic estimation computing device, a higher-level constraint for a word in the document on the basis of a result of topic estimation at a given level, the higher-level constraint indicating an identifier of a topic that is likely to be assigned to the word and the probability of the word being assigned to the topic; and when estimating the probability of each word in the input document being assigned to each topic, referring, by the word latent topic estimation computing device, to the higher-level constraint created by the creating step and using the probability of the word being assigned to a parent topic at a higher level as a weight to perform estimation processing for a lower-level topic.

6. The word latent topic estimation method according to claim 5, wherein the probability of each word in the document being assigned to each topic at a given level is estimated and when the probability of a word being assigned to a topic is smaller than a preset threshold value, the probability is corrected to 0 and a higher-level constraint including an identifier of a topic having a probability greater than 0 and the corrected probability is created.

7. The word latent topic estimation method according to claim 5, wherein after hierarchical topic estimation is performed, the amount of computation when the current initial value of the number of topics is used without change and the amount of computation when the initial value of the number of topics is reduced are computed and, when the difference between the amounts of computation is greater than a predetermined threshold value, the initial value of the number of topics is reduced.

8. The word latent topic estimation method according to claim 5, wherein the number of added documents is counted and, when the counted number of documents is smaller than a predetermined threshold value, an initial value of the number of topics is set so that topic estimation for all topics is performed rather than the hierarchical topic estimation.

9. A non-transitory computer readable medium program that causes a computer serving as an information processing device storing a program for causing a computer to execute a process:

inputting a document including one or more words;

setting the number of topics at each level in accordance with a hierarchical structure of topics for hierarchically estimating a latent topic of a word, the hierarchical structure constituted with a preset width and a preset depth;

creating a higher-level constraint for a word in the document on the basis of a result of topic estimation at a given level, the higher-level constraint indicating an identifier of a topic that is likely to be assigned to the word and the probability of the word being assigned to the topic; and when estimating the probability of each word in the input document being assigned to each topic, referring to the higher-level constraint created by the creating process step and using the probability of the word being assigned to a parent topic at a higher level as a weight to perform estimation processing for a lower-level topic.

* * * * *